(12) United States Patent
Kappler et al.

(10) Patent No.: US 9,664,798 B2
(45) Date of Patent: May 30, 2017

(54) OPERATION OF A COUNTING DIGITAL X-RAY IMAGE DETECTOR

(71) Applicant: Siemens Aktiengesellschaft, München (DE)

(72) Inventors: Steffen Kappler, Effeltrich (DE); Martin Spahn, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 15/071,850

(22) Filed: Mar. 16, 2016

(65) Prior Publication Data

US 2016/0282476 A1    Sep. 29, 2016

(30) Foreign Application Priority Data

Mar. 24, 2015  (DE) .................... 10 2015 205 301

(51) Int. Cl.
*G01J 1/42*        (2006.01)
*G01T 1/17*        (2006.01)

(52) U.S. Cl.
CPC ...................................... *G01T 1/17* (2013.01)

(58) Field of Classification Search
CPC ................................. G01T 1/17; G01T 1/105
See application file for complete search history.

(56) References Cited

U.S. PATENT DOCUMENTS

| | | |
|---|---|---|
| 2008/0001095 A1 | 1/2008 | Astley |
| 2014/0166861 A1* | 6/2014 | Schmitt .................... G01T 1/247 250/208.2 |
| 2015/0369929 A1* | 12/2015 | Durst .................... G01T 1/2018 250/362 |

FOREIGN PATENT DOCUMENTS

| | | |
|---|---|---|
| DE | 102011077859 A1 | 12/2012 |
| DE | 102012224209 A1 | 7/2014 |
| DE | 102013219740 A1 | 4/2015 |

OTHER PUBLICATIONS

Goldan et al., "Photon counting pixels in CMOS technology for medical X-ray imaging applications," 2005, Canadian Conference on Electrical and Computer Engineering, pp. 370-373.*
Spahn, M.: et.al.: "X-ray detectors in medical imaging", in: Nuclear Instruments and Methods in Physics Research A731, pp. 57-63; 2013.

* cited by examiner

*Primary Examiner* — Kiho Kim
(74) *Attorney, Agent, or Firm* — Harness, Dickey & Pierce, P.L.C.

(57) ABSTRACT

A method is disclosed for operating a counting digital X-ray image detector. Each pixel element and/or each pixel cluster is embodied as switchable between a first counting mode and a second counting mode that is different from the first. An at least first count of the number and/or energy of the events in an at least first time interval is performed for each pixel element or each pixel cluster in the first counting mode. An evaluation of the at least first count of the number and/or energy of the events is performed in an evaluation unit of the X-ray image detector. A switchover to the second counting mode is performed as a function of the number and/or energy of the events, and a second count of the number and/or energy of events counted within an at least second time interval is performed in the chosen second counting mode.

28 Claims, 3 Drawing Sheets

OPERATION OF A COUNTING DIGITAL X-RAY IMAGE DETECTOR

PRIORITY STATEMENT

The present application hereby claims priority under 35 U.S.C. §119 to German patent application number DE 102015205301.6 filed Mar. 24, 2015, the entire contents of which are hereby incorporated herein by reference.

FIELD

At least one embodiment of the invention generally relates to a method for operating a counting digital X-ray image detector as well as to an X-ray image detector and/or a medical device for that purpose.

BACKGROUND

X-ray systems are used for imaging in support of diagnostic examinations and for interventional procedures e.g. in cardiology, radiology and surgery. Said X-ray systems consist of at least one X-ray tube, an X-ray detector, corresponding mechanisms, a high-voltage generator, an imaging system, a control unit, and where appropriate a patient couch. Conventional X-ray systems employ integrating X-ray detectors which utilize either scintillators or amorphous semiconductor layers such as selenium for X-ray conversion.

In order to enable new clinical applications such as spectral imaging, but also to achieve a further gain in quantum efficiency, investigations are increasingly focusing on the potential of counting detectors or energy-discriminating counting detectors based on direct-converting materials, such as CdTe, CZT (CdZnTe), Si or GaAs, and contacted ASICs.

A counting digital X-ray image detector for acquiring X-ray images of an object irradiated by X-ray radiation has at least one detector module. The detector module comprises a planar direct converter for converting X-ray radiation into an electrical signal and an array composed of a multiplicity of counting pixel elements, wherein each counting pixel element has a charge or signal input, a conversion device for converting the electrical signal into a count signal, a digital counter for capturing and storing the count signal, and a driver and readout unit. The X-ray image detector is embodied in such a way that each pixel element of the X-ray image detector is connected to the corresponding electrodes of the detector material of the direct converter by way of contacts (bump bonds).

The digital counting X-ray image detector is able to determine the number and/or energy of the events associated with each pixel element or each pixel cluster. The digital counting X-ray image detector provides spatially resolved information relating to the number and/or energy of the events and in addition it offers the possibility of energy-selective imaging.

A pixel element constitutes the smallest detection entity having a connection to evaluation electronics circuitry in the ASIC of the X-ray image detector. A plurality of discriminators are possible per pixel element.

A pixel cluster constitutes an entity composed of a plurality of pixel elements with or without common evaluation logic. The pixel cluster allows a more complex evaluation and/or an evaluation as a function of the neighbor pixel elements; a plurality of discriminators are possible per pixel cluster.

The digital counting X-ray image detector can provide a number of counting modes.

Various effects can now lead to a situation in which an absorbed X-ray quantum deposits its energy not only in one pixel element, but that due to processes such as charge sharing or fluorescence photons (k-fluorescence) some of the energy is deposited in the neighboring pixel elements or is not taken into account. This can lead to miscounts and/or incorrect assignment of the energy in the case of energy-discriminating detectors. Summation and anticoincidence circuits can be utilized in order to mitigate or avoid these effects.

A counting digital X-ray image detector for acquiring X-ray images of an object irradiated by X-ray radiation is known from the as yet unpublished German application bearing the official application number 102013219740.3, the entire contents of which are hereby incorporated herein by reference.

At high X-ray fluxes it becomes more difficult to discriminate independent events and the probability of miscounts increases. In the evaluation of signals as a function of the neighbor pixels, a number of pixel elements are blocked, thereby further increasing the proportion of miscounts. The aim of good energy resolution is at odds with a maximally error-free count at high X-ray fluxes.

SUMMARY

At least one embodiment of the invention discloses a method for operating a counting digital X-ray image detector which enables the best possible energy resolution as a function of the prevailing photon flux and at the same time avoids miscounts. At least one embodiment of the invention discloses a counting digital X-ray image detector and/or a medical device which allow the best possible energy resolution as a function of the prevailing photon flux and at the same time avoid miscounts.

A method for operating a counting digital X-ray image detector; a counting digital X-ray image detector; and a medical device are disclosed.

At least one embodiment of the invention relates to a method for operating a counting digital X-ray image detector, the latter having a plurality of pixel elements, wherein each pixel element and/or each one of a plurality of pixel clusters which can be composed from pixel elements are/is embodied as switchable between a first counting mode and a second counting mode that is different from the first. In one step, an at least first count of the number and/or energy of the events $N_{base,1}$ in an at least first time interval $T_{base,1}$ is performed for each pixel element or each pixel cluster in the first counting mode. In a further step, an evaluation of the at least first count of the number and/or energy of the events $N_{base,1}$ is performed in an evaluation unit of the X-ray image detector. In a further step, a switchover to the second counting mode is performed based on the evaluation of the number and/or energy of the events $N_{base,1}$. In a further step, a second count of the number and/or energy of events $N_{meas}$ counted within an at least second time interval $T_{meas}$ is performed in the chosen second counting mode.

At least one embodiment of the invention relates to a counting digital X-ray image detector for carrying out at least one embodiment of the method, wherein each pixel element and/or each pixel cluster have/has a counting unit and wherein each pixel element and/or each one of a plurality of pixel clusters that are composable from pixel elements are/is embodied as switchable between a first counting mode and a second counting mode that is different from the first. The X-ray image detector additionally comprises an evaluation unit and a switchover unit. The counting unit is configured to perform an at least first count of the number and/or energy of the events $N_{base,1}$ in an at least first time interval $T_{base,1}$ in the first counting mode. The evaluation unit is configured to perform an evaluation of the at least first count of the number and/or energy of the events $N_{base,1}$. The switchover unit is configured to perform a switchover to the second counting mode based on the evaluation of the number and/or energy of the events $N_{base,1}$. The counting unit is configured to perform a second count of the number and/or energy of registered events $N_{meas}$ within an at least second time interval $T_{meas}$ in the chosen second counting mode.

At least one embodiment of the invention relates further to a medical device for acquiring images of an object irradiated by electromagnetic and/or ionizing radiation, having a counting digital X-ray image detector of at least one embodiment of the invention.

In further embodiment of the invention, a medical device for acquiring images of an object irradiated by electromagnetic and/or ionizing radiation can be implemented as a computed tomography system, angiography system, mobile or robot-assisted C-arm system, projection radiography system or as other systems.

Further advantageous developments are set forth in the claims.

BRIEF DESCRIPTION OF THE DRAWINGS

The above-described characteristics, features and advantages of the present invention, as well as the manner in which these are realized, will become clearer and more readily understandable in connection with the following description of the example embodiments, which are explained in more detail with reference to the drawings, in which.

DETAILED DESCRIPTION OF THE EXAMPLE EMBODIMENTS

Figure 1:
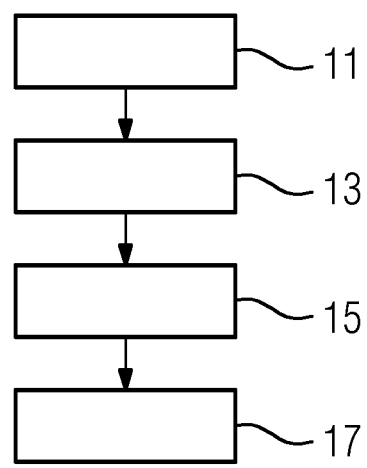
FIG. 1 shows a schematic representation of an embodiment of an inventive method for operating a counting digital X-ray image detector.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

At least one embodiment of the invention relates to a method for operating a counting digital X-ray image detector, the latter having a plurality of pixel elements, wherein each pixel element and/or each one of a plurality of pixel clusters which can be composed from pixel elements are/is embodied as switchable between a first counting mode and a second counting mode that is different from the first. In one step, an at least first count of the number and/or energy of the events $N_{base,1}$ in an at least first time interval $T_{base,1}$ is performed for each pixel element or each pixel cluster in the first counting mode. In a further step, an evaluation of the at least first count of the number and/or energy of the events $N_{base,1}$ is performed in an evaluation unit of the X-ray image detector. In a further step, a switchover to the second counting mode is performed based on the evaluation of the number and/or energy of the events $N_{base,1}$. In a further step, a second count of the number and/or energy of events $N_{meas}$ counted within an at least second time interval $T_{meas}$ is performed in the chosen second counting mode.

The ability to switch over between the first counting mode and the second counting mode affords the advantage that a change in counting mode is possible, even multiple times in succession. For example, the switchover can be initiated automatically based on fulfillment of a condition. The counting mode is switchable in any pixel element and/or any pixel cluster independently of neighboring pixel elements and/or pixel clusters. Several example combinations of the use of pixel elements and pixel clusters will now be cited as examples, though other combinations are also possible. It is possible for example to switch over the counting mode in all pixel elements independently of the neighboring pixel elements in each case. Alternatively, when pixel clusters are used, for example, the counting mode of all of the pixel clusters can be switched over independently of the neighboring pixel clusters in each case. Alternatively, in the case of the use of pixel elements and pixel clusters, for example, the counting mode can be switched over independently of the neighboring pixel elements and pixel clusters in each case.

The number and/or energy of events in a first time interval are/is counted in a first count. The first count advantageously enables an estimation of the ambient conditions, in particular the estimation of the photon flux level that is present. An evaluation can be performed in further steps on the basis of said first count.

An evaluation of the first count is performed in an evaluation unit of the detector. The evaluation advantageously takes place directly following the first count and/or directly in the detector, thereby reducing time losses and data transfer.

The switchover is performed following the evaluation of the first count. It is of advantage for the switchover to be automated and performed based on the prior evaluation of the first count in the first time interval, thereby reducing time losses and data transfer. Taking account of the local photon flux in the current acquisition is made possible.

The acquisition is terminated with a second count, the overall result of the acquisition being composed of the first count and the second count together or being based on the second count only. It is advantageous to conduct a second count after the switchover in order to obtain a better result in comparison with retaining the first counting mode. At the same time unfavorable influences of the first counting mode, including for example miscounts and/or a degradation of energy resolution, are avoided.

At least one embodiment of the invention relates to a counting digital X-ray image detector for carrying out at least one embodiment of the method, wherein each pixel element and/or each pixel cluster have/has a counting unit and wherein each pixel element and/or each one of a plurality of pixel clusters that are composable from pixel elements are/is embodied as switchable between a first counting mode and a second counting mode that is different from the first. The X-ray image detector additionally comprises an evaluation unit and a switchover unit. The counting unit is configured to perform an at least first count of the number and/or energy of the events $N_{base,1}$ in an at least first time interval $T_{base,1}$ in the first counting mode. The evaluation unit is configured to perform an evaluation of the at least first count of the number and/or energy of the events $N_{base,1}$. The switchover unit is configured to perform a switchover to the second counting mode based on the evaluation of the number and/or energy of the events $N_{base,1}$. The counting unit is configured to perform a second count of the number and/or energy of registered events $N_{meas}$ within an at least second time interval $T_{meas}$ in the chosen second counting mode.

The counting unit can comprise a plurality of counters. Preferably, the first count and the second count are performed in one counter. In an alternative embodiment variant of the invention, different counters can be used for the first count and for the second count.

A preferred embodiment variant of the invention has an evaluation unit which is embodied together with a comparator directly in the ASIC. An advantageous aspect of this arrangement is the automatic data processing in the detector with avoidance of data transfer between ASIC and detector readout unit.

A preferred embodiment variant of the invention has a switchover unit which is embodied directly in the ASIC. An advantageous aspect of this arrangement is the avoidance of data traffic between ASIC and detector readout unit.

At least one embodiment of the invention relates further to a medical device for acquiring images of an object irradiated by electromagnetic and/or ionizing radiation, having a counting digital X-ray image detector of at least one embodiment of the invention.

In further embodiment of the invention, a medical device for acquiring images of an object irradiated by electromagnetic and/or ionizing radiation can be implemented as a computed tomography system, angiography system, mobile or robot-assisted C-arm system, projection radiography system or as other systems.

Further advantageous developments are set forth in the claims.

According to one aspect of an embodiment of the inventive method, one of the counting modes is a counting mode called "simple counting mode", in which a count is taken of the number and/or energy of the events in each pixel element or in each pixel cluster.

In the counting mode called "simple counting mode", the number and/or energy of the events are/is counted independently of the events in the neighboring pixel elements or pixel clusters. In this case it is advantageous that no complex operations for evaluating an event are performed and consequently dead times and paralysis associated therewith are avoided. It is furthermore of advantage that a blockade of a plurality of pixel elements is avoided. In the counting mode called "simple counting mode", in particular the summation and/or anticoincidence can be deactivated. Counting is conducted without using information from neighbor pixels. Energy resolution now suffers, and miscounts, in the form of too many or too few events, can also occur.

According to one aspect of an embodiment of the inventive method, one of the counting modes is a counting mode called "reconstruction mode", in which a count is taken of the number and/or energy of the events, wherein one sum signal in each case is determined at different nodal points of neighboring pixel elements and the sum signals are in each case assigned to that pixel element which has the largest individual signal contributing to the respective sum signal.

In the counting mode called "reconstruction mode", a summation circuit and optionally an anticoincidence circuit are/is used in the pixel cluster, consisting of affected pixel element and neighboring pixel elements. The charges of a single event that are divided up among a plurality of pixel elements are allocated to one pixel element as an overall event. The avoidance of miscounts and a better energy resolution are advantageous.

An individual signal represents the signal of one counted event in one pixel element, in which case the individual signal can comprise an entire event corresponding to the total energy deposited by an X-ray quantum or else only a part of the event corresponding to a fraction of the energy deposited by an X-ray quantum.

The sum signal represents the sum of the individual signals of all neighboring pixel elements taken into account at the nodal point.

The nodal point lies between, for example, four adjoining pixel elements (2×2 cluster). It has proven advantageous if the point assigned to one of said pixel elements of the pixel structure is the crossing point of the pixel elements. Common summation and anticoincidence logic and logic for allocating the sum signal are present for each nodal point. The summation and anticoincidence logic is used only when at least one neighboring pixel element is set to the counting mode "reconstruction mode". At nodal points with adjoining pixel elements in a different counting mode from the counting mode "reconstruction mode", only the individual signals that were counted by pixel elements in the counting mode "reconstruction mode" are used for the summation.

According to one aspect of an embodiment of the inventive method, at least one threshold for the number and/or energy of the counted events is used for the evaluation.

The at least one threshold can be embodied by unilateral discrimination or by window discrimination.

A first threshold and further thresholds can assume the same or different values. In a preferred embodiment variant, the first threshold can be embodied as greater than a second threshold. This is advantageous in order to achieve the best possible energy resolution and to avoid frequent changes in counting mode close to the threshold. In addition, the switchover operations within a certain number of acquisitions can also be limited.

According to one aspect of an embodiment of the inventive method, a counting mode "reconstruction mode", in which a count is taken of the number and/or energy of the events, is chosen as the first counting mode, wherein in the counting mode "reconstruction mode" one sum signal in each case is determined at different nodal points of neighboring pixel elements and the sum signals are in each case assigned to that pixel element which has the largest individual signal contributing to the respective sum signal. A counting mode "simple counting mode", in which a count is taken of the number and/or energy of the events in each pixel element or in each pixel cluster, is chosen as the second counting mode if the number of events in the first time interval $T_{base,1}$ or a prediction of the number of events in the time interval $T_{meas}$ lies above a first threshold.

Assuming the first counting mode is the counting mode "reconstruction mode", a switchover to the counting mode "simple counting mode" as the second counting mode is made if the number and/or energy of the events $N_{base,1}$ in the at least first time interval $T_{base,1}$ or a prediction of the number of events in the time interval $T_{meas}$ exceeds the first threshold. All line integrals are important for 3D reconstruction algorithms. If information is lacking, approximations can be made only based on specific assumptions. Information from the projection angles at which direct radiation is incident on the X-ray image detector or at which only peripheral regions of the patient are impinged upon is also relevant, in particular for artifact-free low-contrast imaging. As a result of the use of the counting mode "reconstruction mode" as the first counting mode and the counting mode "simple counting mode" as the second counting mode, energy-selective information is advantageously generated in the case of low or medium photon fluxes in the first counting mode, as also is linear or linearizable information in the case of high photon fluxes in the second counting mode, which is advantageous for the 3D reconstruction.

According to one aspect of an embodiment of the inventive method, a counting mode "simple counting mode", in which a count is taken of the number and/or energy of the events in each pixel element or in each pixel cluster, is chosen as the first counting mode. A counting mode "reconstruction mode", in which a count is taken of the number and/or energy of the events, is chosen as the second counting mode, wherein in the counting mode "reconstruction mode" one sum signal in each case is determined at different nodal points of neighboring pixel elements and the sum signals are in each case assigned to that pixel element which has the largest individual signal contributing to the respective sum signal if the number of events in the first time interval $T_{base,1}$ or a prediction of the number of events in the time interval $T_{meas}$ lies below a second threshold.

Assuming the first counting mode is the counting mode "simple counting mode", a switchover to the counting mode "reconstruction mode" as the second counting mode is made if the number and/or energy of the events $N_{base,1}$ in the at least first time interval $T_{base,1}$ or a prediction of the number of events in the time interval $T_{meas}$ falls below the second threshold. All line integrals are important for 3D reconstruction algorithms. If information is lacking, approximations can be made only based on specific assumptions. Information from the projection angles at which direct radiation is incident on the X-ray image detector or at which only peripheral regions of the patient are impinged upon are also relevant, in particular for artifact-free low-contrast imaging. As a result of the use of the counting mode "simple counting mode" as the first counting mode and the counting mode "reconstruction mode" as the second counting mode, linear or linearizable information is advantageously generated in the case of high photon fluxes in the first counting mode, which is advantageous for the 3D reconstruction, as also is energy-selective information in the case of low or medium photon fluxes in the second counting mode.

According to one aspect of an embodiment of the inventive method, the first time interval $T_{base,1}$ is chosen smaller than the second time interval $T_{meas}$.

A fraction of the time interval $T_{meas}+T_{base,1}$ is advantageously used in order to estimate the likely photon flux. The first time interval $T_{base,1}$ can accordingly be chosen smaller than the second time interval $T_{meas}$, in which case the first time interval $T_{base,1}$ can be in the order of 10 percent or less, 1 percent or less or 0.1 percent or less of the time interval $T_{meas}+T_{base,1}$.

According to one aspect of an embodiment of the inventive method, the number of events in the time interval $T_{meas}+T_{base,1}$ is represented by multiplication of the number and/or energy of the events $N_{meas}$ in the time interval $T_{meas}$ with the factor $(T_{meas}+T_{base,1})/T_{meas}$, or by the number and/or energy of the events $N_{meas}$ in the time interval $T_{meas}$ if the first time interval $T_{base,1}$ is 10 percent or less of the time interval $T_{meas}$, or by the sum from the number and/or energy of the events in the time interval $T_{base,1}$ and the number and/or energy of the events in the time interval $T_{meas}$.

The number of events in the time interval $T_{meas}+T_{base,1}$ corresponds to the number of events that were counted for the image acquisition by the detector. It is advantageous to use the number of all of the events in the time interval $T_{meas}+T_{base,1}$ in order to achieve the lowest possible loss of photons to assure good image quality and an optimal utilization of the dose. It is beneficial to calculate the events in the time interval $T_{meas}+T_{base,1}$ in order to correct or take into account the number of events in the first time interval $T_{base,1}$.

The number of events in the time interval $T_{meas}+T_{base,1}$ can be estimated by multiplication of the number and/or energy of the events $N_{meas}$ in the time interval $T_{meas}$ with the factor $(T_{meas}+T_{base,1})/T_{meas}$. This extrapolation onto the time interval $T_{meas}+T_{base,1}$ is advantageous, because the number and/or energy of the events are/is based on the counting method applied in a single counting mode and the count of the events was performed only in the counting mode adapted to the photon flux. An avoidance of miscounts and an optimization of the energy resolution are advantageously achieved. The multiplication operation can in this case also be performed outside of the ASIC.

In a further embodiment of the invention, the number of events in the time interval $T_{meas}+T_{base,1}$ can be represented by the number and/or energy of the events $N_{meas}$ in the time interval $T_{meas}$ if the first time interval $T_{base,1}$ is 10 percent or less, 5 percent or less or 1 percent or less of the time interval $T_{meas}$. The avoidance of operations inside and outside of the ASIC is advantageous.

In a further embodiment of the invention, the number of events in the time interval $T_{meas}+T_{base,1}$ is represented by the sum from the number and/or energy of the events in the time interval $T_{base,1}$ and the number and/or energy of the events in the time interval $T_{meas}$. Using the first count and the second count advantageously includes changes in the photon flux, e.g. due to changes in object attenuation, during the acquisition. It is beneficial that no information is wasted and an optimal use of the photon statistics is achieved, while at the same time patient dose unused for the image is avoided.

According to one aspect of an embodiment of the inventive method, the difference between the time interval $T_{base,1}$ and the time interval $T_{meas}$ is less than 10 percent of $T_{base,1}$.

The time interval $T_{base,1}$ and the time interval $T_{meas}$ are chosen to be of substantially the same duration, with the difference between the time interval $T_{base,1}$ and the time interval $T_{meas}$ preferably being 10 percent or less of $T_{base,1}$. In a preferred embodiment variant of the invention, the first count in the first time interval is used for a prior image. It is advantageous that it is not necessary to take into account the number of events in the first time interval for the number and/or energy of the events in the current image acquisition. Computing operations or assumptions for correcting the number and/or energy of the events are avoided as a result.

According to one aspect of an embodiment of the inventive method, the steps of the at least first count, the evaluation, the switchover and the second count are repeated n times. A plurality of time intervals $T_{base,1}$ to $T_{base,n}$ having the duration of the time interval $T_{meas}$ are used to calculate a gradient from the number and/or energy of the events in the time intervals $T_{base,1}$ to $T_{base,n}$ for calculating the number and/or energy of the events to be expected in the time interval $T_{meas}$.

The steps of the at least first count, the evaluation, the switchover and the second count are repeated n times, as a result of which a plurality of time intervals $T_{base,1}$ to $T_{base,n}$ are obtained. The time intervals $T_{base,1}$ to $T_{base,n}$ having the duration of the time interval $T_{meas}$ are used in the evaluation, thereby advantageously enabling a prediction of the number and/or energy of the events to be expected in the time interval $T_{meas}$. The plurality of time intervals $T_{base,1}$ to $T_{base,n}$ can in this case be used for prior image acquisitions. The avoidance of frequent switchovers between the counting modes is advantageous. The use of a plurality of time intervals $T_{base,1}$ to $T_{base,n}$ is a preferred embodiment variant, in particular when a number of image acquisitions for which the object has moved only slightly relative to the position of X-ray emitter and X-ray image detector are performed in succession, i.e. in each pixel an approximately identical counting rate can be expected for the current image acquisition as for the preceding image acquisition.

The plurality of time intervals $T_{base,1}$ to $T_{base,n}$ are used to calculate the number expected for each pixel element or each pixel cluster. It is beneficial to calculate the gradient in order to determine a trend indicating whether the number of events is increasing or decreasing, in which case at least two first counts are necessary.

According to one aspect of an embodiment of the inventive X-ray image detector, a counting mode called "reconstruction mode" is chosen as the first counting mode, in which a count is taken of the number and/or energy of the events, wherein a sum signal is determined in each case at different nodal points of neighboring pixel elements in the counting mode "reconstruction mode" and the sum signals are in each case assigned to that pixel element which has the largest individual signal contributing to the respective sum signal. A counting mode called "simple counting mode" is chosen as the second counting mode, in which a count is taken of the number and/or energy of the events in each pixel element or in each pixel cluster if the number of events in the first time interval $T_{base,1}$ or a prediction of the number of events in the time interval $T_{meas}$ lies above the first threshold.

The embodiment of the inventive X-ray image detector also has the advantages corresponding to an embodiment of the inventive method.

According to one aspect of an embodiment of the inventive X-ray image detector, a counting mode called "simple counting mode" is chosen as the first counting mode, in which a count is taken of the number and/or energy of the events in each pixel element or in each pixel cluster. A counting mode called "reconstruction mode" is chosen as the second counting mode, in which a count is taken of the number and/or energy of the events, wherein a sum signal is determined in each case at different nodal points of neighboring pixel elements in the counting mode "reconstruction mode" and the sum signals are in each case assigned to that pixel element which has the largest individual signal contributing to the respective sum signal if the number of events in the first time interval $T_{base,1}$ or a prediction of the number of events in the time interval $T_{meas}$ lies below the second threshold.

The embodiment of the inventive X-ray image detector also has the advantages corresponding to an embodiment of the inventive method.

According to one aspect of an embodiment of the inventive medical device, the medical device constitutes a device for slice imaging of an object irradiated by electromagnetic and/or ionizing radiation.

A preferred embodiment variant of the invention is a medical device for slice imaging, such as a C-arm system or a computed tomography system, for example.

FIG. 1 shows a schematic representation of an embodiment of an inventive method for operating a counting digital X-ray image detector 54. The method comprises the step of an at least first count 11, the step of evaluation 13, the step of switchover 15, and the step of a second count 17. The at least first count 11 of the number and/or energy of the events $N_{base,1}$ is performed in an at least first time interval $T_{base,1}$ in the first counting mode. The first counting mode can for example represent a counting mode called "simple counting mode" 2 or a counting mode called "reconstruction mode" 1. The evaluation 13 of the at least first count 11 of the number and/or energy of the events $N_{base,1}$ is performed in an evaluation unit 45 of the X-ray image detector, for example in the form of a comparator. The switchover 15 to the second counting mode is performed next as a function of the number and/or energy of the events $N_{base,1}$, for example if the comparator of the evaluation unit detects that a previously specified number of events has been exceeded in the first time interval. The second count 17 of the number and/or energy of events $N_{meas}$ counted within an at least second time interval $T_{meas}$ is performed in the chosen second counting mode, the second counting mode being a counting mode different from the first counting mode. If, for example, the first counting mode is a counting mode "reconstruction mode" 1, the second counting mode can be a counting mode "simple counting mode" 2.

Figure 2:
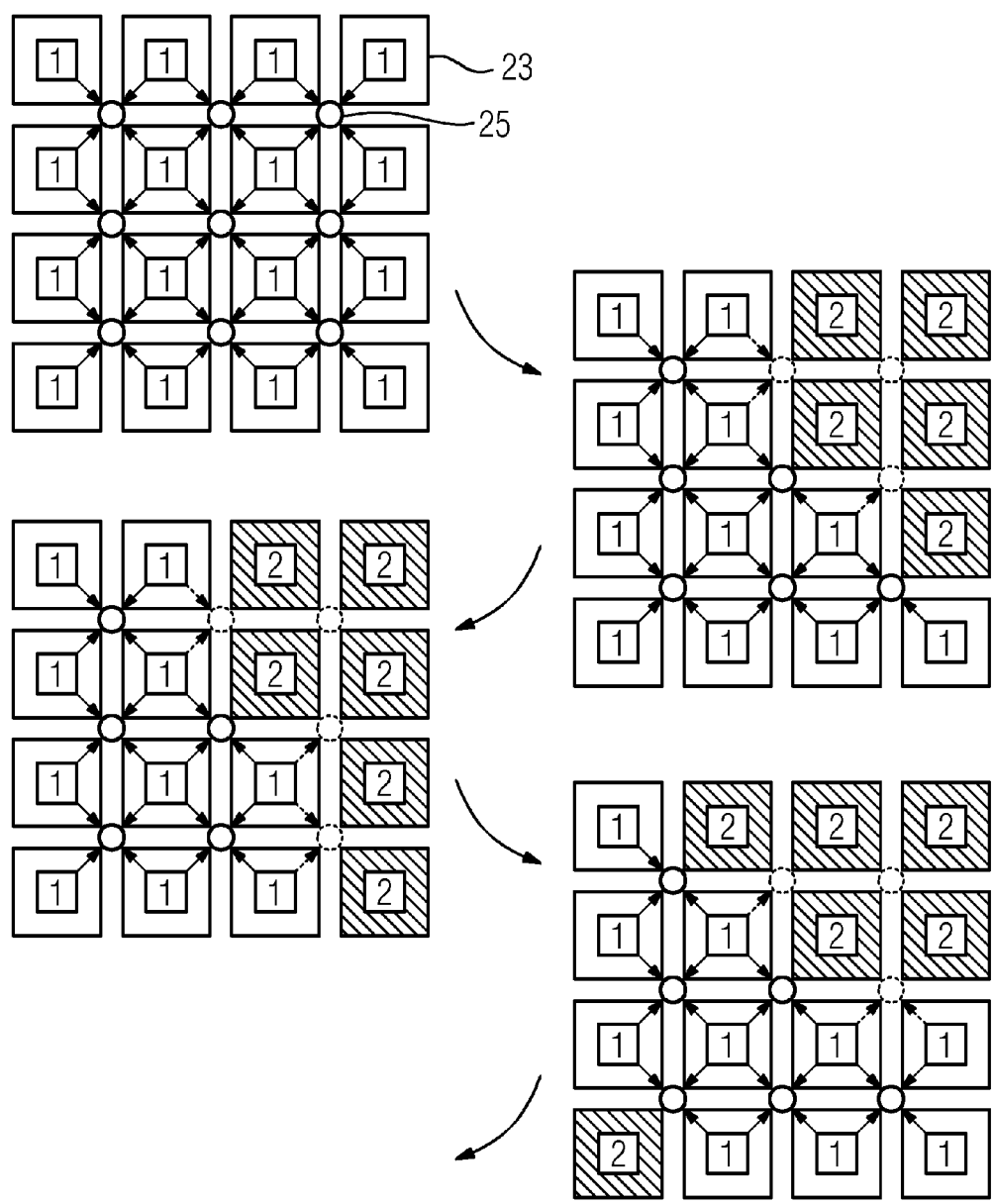
FIG. 2 shows a schematic representation of switchover operations between first counting mode and second counting mode.

FIG. 2 shows a schematic representation of switchover operations between first counting mode and second counting mode.

In this example embodiment, all of the pixel elements 23 are initially set to a first counting mode, which is a counting mode called "reconstruction mode" 1. The at least first count 11 is carried out. The individual signals are copied to the nodal points 25, where a sum signal is formed from the individual signals of the four adjoining pixel elements 23 and the sum signal is allocated to the pixel element that contributes the largest individual signal. The evaluation 13 of the at least first count 11 leads to a switchover 15 of individual pixel elements 23 to the second counting mode, which is a counting mode called "simple counting mode" 2. The nodal points 25 having fewer than three adjoining pixel elements 23 in the counting mode "reconstruction mode" 1 are deactivated. A second count 17 is performed. The second count 17 can for example be drawn upon as the first count 11 for the next acquisition. A different first counting mode is chosen for some of the pixel elements. The evaluation 13 of said first count 11 in the first counting mode leads to a switchover 15 of a pixel element 23 to the second counting mode, which is a counting mode "simple counting mode" 2. The nodal points 25 having fewer than three adjoining pixel elements 23 in the counting mode "reconstruction mode" 1 are deactivated. A second count 17 is performed. This second count 17 can now be drawn upon as the first count 11 for the next acquisition. A different first counting mode is chosen for some of the pixel elements. The evaluation 13 leads to the switchover 15 of two pixel elements 23 to the second counting mode, which is a counting mode "reconstruction mode" 1, and to the switchover 15 of one pixel element 23 to the second counting mode, which is a counting mode "simple counting mode" 2. The nodal points 25 having fewer than three adjoining pixel elements 23 in the counting mode "reconstruction mode" 1 are deactivated. The nodal points 25 having at least three adjoining pixel elements 23 in the counting mode "reconstruction mode" 1 are activated. A second count 17 is performed. This can be followed by further acquisitions.

Figure 3:
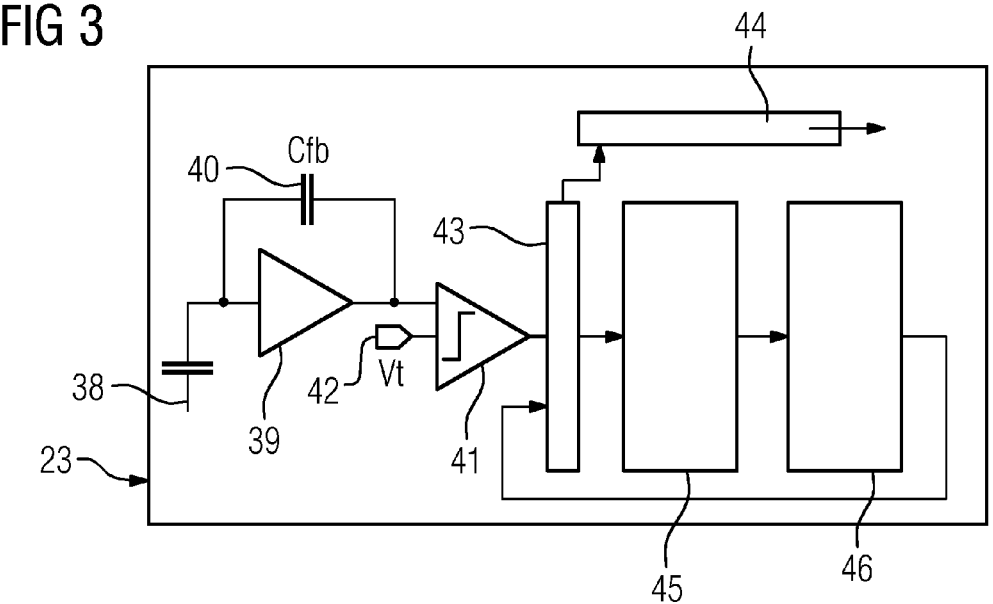
FIG. 3 shows a schematic representation of an embodiment of an inventive counting pixel element for implementing the inventive method.

FIG. 3 shows a schematic representation of an embodiment of an inventive counting pixel element 23 for implementing the method. The pixel element 23 typically consists of a charge or signal input 38, a charge amplifier or preamplifier and pulse shaper 39, a discriminator 41, a counting unit 43, an evaluation unit 45, a switchover unit 46, a driver unit and readout logic 44. The threshold value Vt can be adjusted. The electrical charge passes the charge or signal input 38 as detector input, is collected in the pixel element 23 and amplified there with the aid of a charge amplifier 39 and a feedback capacitor Cfb 40. In addition, the pulse shape can be adjusted at the output in a shaper, or alternatively a filter. An event is counted when the output signal exceeds an adjustable threshold value. This is detected via a discriminator 41. In principle the threshold value can also be predefined as a fixed analog value by means of a threshold value generator 42, though generally it is applied via a digital-to-analog converter (D/A converter, DAC), for example, and is consequently variably adjustable over a certain range. If the threshold is exceeded, the count is incremented by one in a digital counting unit 43. The first count 11 can then be evaluated in an evaluation unit 45, for example by means of a comparator. The switchover unit 46 initiates a change from the first counting mode to the second counting mode. A second count is performed. The result can subsequently be read out via readout logic 44. In an alternative embodiment variant, the pixel elements and/or pixel clusters can be embodied with a plurality of discriminators.

Figure 4:
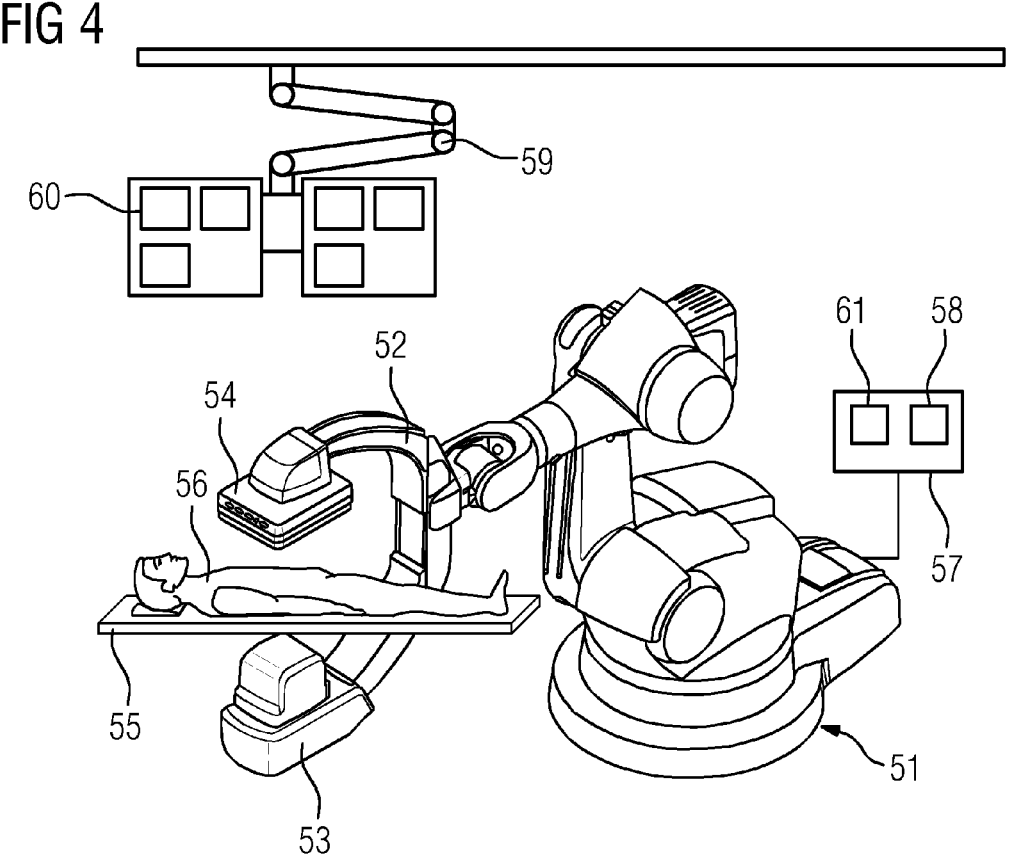
FIG. 4 shows a schematic representation of an embodiment of an inventive medical device for slice imaging having an inventive counting digital X-ray image detector.

FIG. 4 shows an example implementation of an embodiment of an inventive medical device for slice imaging as a C-arm system having an inventive counting digital X-ray image detector 54. The X-ray system has a supporting pedestal 51, for example in the form of an industrial robot, having a C-arm 52 carried by the supporting pedestal 51. Attached to the ends of the C-arm 52 are an X-ray emitter 53 with X-ray tube and collimator as well as the inventive counting digital X-ray image detector 54 as image acquisition unit. The C-arm 52 can be positioned by means of the degrees of freedom provided by the supporting pedestal 51. A patient 56 to be examined is positioned as examination object in the beam path of the X-ray emitter 53 on a tabletop platform 55 of a patient support table. A system control unit 57 having a high-voltage generator for generating the tube voltage and an imaging system 58 is connected to the medical device. The imaging system 58 receives and processes the image signals of the X-ray image detector 54. The X-ray images can then be viewed on displays of a traffic-light-like monitor array 60 suspended by means of a ceiling-mounted carrier system 59. In this configuration, the carrier system 59 has displacement, pan-and-tilt and/or height-adjusting units. A processing circuit 61 is also provided in the system control unit 57.

An embodiment of the invention can also be realized in a computed tomography system (not shown). A computed tomography system includes a gantry having a rotor. The rotor comprises at least one radiation source and at least one detector device having the counting digital X-ray image detector according to an embodiment of the invention. The patient is positioned and supported on the patient couch and can be moved through the gantry along the rotation axis z. A computing unit is used for control purposes and for calculating the slice images. An input device and an output device are connected to the computing unit.

Although the invention has been illustrated in greater detail on the basis of the preferred example embodiment, the invention is not limited by the disclosed examples and other variations can be derived herefrom by the person skilled in the art without leaving the scope of protection of the invention.

The aforementioned description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods. Further, elements and/or features of different example embodiments may be combined with each other and/or substituted for each other within the scope of this disclosure and appended claims.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Further, at least one embodiment of the invention relates to a non-transitory computer-readable storage medium comprising electronically readable control information stored thereon, configured in such that when the storage medium is used in a controller of a magnetic resonance device, at least one embodiment of the method is carried out.

Even further, any of the aforementioned methods may be embodied in the form of a program. The program may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for operating a counting digital X-ray image detector including a plurality of pixel elements, a plurality of pixel clusters being composable from a plurality of the pixel elements, the counting digital X-ray image detector being switchable between at least two different counting modes, the method, comprising:
performing at least one count, in at least one of the at least two different counting modes of the digital X-ray image detector, of at least one of a number and energy of events in an at least one time interval;
performing a switchover to another of the at least two counting modes based on an evaluation, of the at least one count of at least one of the number and energy of the events, performed in an evaluation unit of the X-ray image detector; and
performing another count, in at least another of the at least two different counting modes of the digital X-ray image detector, of at least one of the number and energy of events in an at least another time interval.

2. The method of claim 1, wherein one of the at least two different counting modes is a counting mode called "simple counting mode" and wherein a count is taken of at least one of the number and energy of the events in each of a plurality of pixel elements or each of a plurality of pixel clusters.

3. The method of claim 2, wherein one of the at least two different counting modes is a counting mode called "reconstruction mode", wherein a count is taken of at least one of the number and energy of the events, wherein one sum signal is respectively determined at each of different nodal points of neighboring pixel elements and wherein the respective sum signals are assigned to a pixel element including the relatively largest individual signal contributing to the respective sum signal.

4. The method of claim 2, wherein at least one threshold of at least one of the number and energy of the counted events is used for the evaluation performed.

5. The method of claim 2, wherein a counting mode "reconstruction mode" is chosen as a first of the at least two different counting modes, wherein a count is taken of at least one of the number and energy of the events, wherein one sum signal is respectively determined at each of different nodal points of neighboring pixel elements in the counting mode "reconstruction mode" and the sum signals are each respectively assigned to the respective pixel element which has the relatively largest individual signal contributing to the respective sum signal, and wherein a counting mode "simple counting mode" is chosen as the at least another of the at least two different counting modes, wherein a count is taken of at least one of the number and energy of the events in each respective pixel element or in each respective pixel cluster if the number of events in the one time interval or a prediction of the number of events in the time interval exceeds a first threshold.

6. The method of claim 2, wherein a counting mode "simple counting mode" is chosen as a first of the at least two different counting modes, wherein a count is taken of at least one of the number and energy of the events in each respective pixel element or in each respective pixel cluster and wherein a counting mode "reconstruction mode" is chosen as the at least another of the at least two different counting modes; wherein a count is taken of at least one of the number and energy of the events, wherein one respective sum signal is determined at each different nodal points of neighboring pixel elements in the counting mode "reconstruction mode" and wherein the sum signals are each respectively assigned to the respective pixel element which has the relatively largest individual signal contributing to the respective sum signal if the number of events in the one time interval or a prediction of the number of events in the time interval lies below a second threshold.

7. The method of claim 1, wherein one of the at least two different counting modes is a counting mode called "reconstruction mode", wherein a count is taken of at least one of the number and energy of the events, wherein one sum signal is respectively determined at each of different nodal points of neighboring pixel elements and wherein the respective sum signals are assigned to a pixel element including the relatively largest individual signal contributing to the respective sum signal.

8. The method of claim 7, wherein a counting mode "reconstruction mode" is chosen as a first of the at least two different counting modes, wherein a count is taken of at least one of the number and energy of the events, wherein one sum signal is respectively determined at each of different nodal points of neighboring pixel elements in the counting mode "reconstruction mode" and the sum signals are each respectively assigned to the respective pixel element which has the relatively largest individual signal contributing to the respective sum signal, and wherein a counting mode "simple counting mode" is chosen as the at least another of the at least two different counting modes, wherein a count is taken of at least one of the number and energy of the events in each respective pixel element or in each respective pixel cluster if the number of events in the one time interval or a prediction of the number of events in the time interval exceeds a first threshold.

9. The method of claim 7, wherein a counting mode "simple counting mode" is chosen as a first of the at least two different counting modes, wherein a count is taken of at least one of the number and energy of the events in each respective pixel element or in each respective pixel cluster and wherein a counting mode "reconstruction mode" is chosen as the at least another of the at least two different counting modes, wherein a count is taken of at least one of the number and energy of the events, wherein one respective sum signal is determined at each different nodal points of neighboring pixel elements in the counting mode "reconstruction mode" and wherein the sum signals are each respectively assigned to the respective pixel element which has the relatively largest individual signal contributing to the respective sum signal if the number of events in the one time interval or a prediction of the number of events in the time interval lies below a second threshold.

10. The method of claim 1, wherein at least one threshold of at least one of the number and energy of the counted events is used for the evaluation performed.

11. The method of claim 1, wherein a counting mode "reconstruction mode" is chosen as a first of the at least two different counting modes, wherein a count is taken of at least one of the number and energy of the events, wherein one sum signal is respectively determined at each of different nodal points of neighboring pixel elements in the counting mode "reconstruction mode" and the sum signals are each respectively assigned to the respective pixel element which has the relatively largest individual signal contributing to the respective sum signal, and wherein a counting mode "simple counting mode" is chosen as the at least another of the at least two different counting modes, wherein a count is taken of at least one of the number and energy of the events in each respective pixel element or in each respective pixel cluster if the number of events in the one time interval or a prediction of the number of events in the time interval exceeds a first threshold.

12. The method of claim 1, wherein a counting mode "simple counting mode" is chosen as a first of the at least two different counting modes, wherein a count is taken of at least one of the number and energy of the events in each respective pixel element or in each respective pixel cluster and wherein a counting mode "reconstruction mode" is chosen as the at least another of the at least two different counting modes, wherein a count is taken of at least one of the number and energy of the events, wherein one respective sum signal is determined at each different nodal points of neighboring pixel elements in the counting mode "reconstruction mode" and wherein the sum signals are each respectively assigned to the respective pixel element which has the relatively largest individual signal contributing to the respective sum signal if the number of events in the one time interval or a prediction of the number of events in the time interval lies below a second threshold.

13. The method of claim 1, wherein the one time interval is $T_{base,1}$ and is chosen to be relatively smaller than the another time interval, the another time interval being $T_{meas}$.

14. The method as claimed in claim 13, wherein in addition, the at least one of number and energy of the events in the time interval $T_{meas}+T_{base,1}$ is represented by multiplication of the at least one of number and energy of the events in the another time interval $T_{meas}$ with the factor $(T_{meas}+T_{base,1})/T_{meas}$, or is represented by at least one of the number and energy of the events in the another time interval $T_{meas}$ if the one time interval $T_{base,1}$ is 10 percent or less of the another time interval $T_{meas}$, or is represented by a sum from the at least one of number and energy of the events in the one time interval $T_{base,1}$ and at least one of the number and energy of the events in the another time interval $T_{meas}$.

15. The method of claim 1, wherein the difference between the one time interval and the another time interval is 10 percent or less of the one time interval.

16. The method of claim 1, wherein each of the performing steps are repeated n times and wherein a plurality of time intervals $T_{base,1}$ to $T_{base,n}$ having a duration of a time interval $T_{meas}$ are used to calculate a gradient from at least one of the number and energy of the events in the time intervals $T_{base,1}$ to $T_{base,n}$ for calculating at least one of the number and energy of the events to be expected in the time interval $T_{meas}$.

17. The method of claim 1, wherein the at least two different counting modes of the digital X-ray image detector include at least a counting mode involving at least one of a number and energy of events for individual pixel elements or pixel clusters and a counting mode involving at least one of a number and energy of events for individual pixel elements or pixel clusters and for neighboring pixel elements or pixel clusters.

18. The method of claim 1, wherein the at least one count and the another count are counts of at least one of the number and energy of the events emanating from an object irradiated by at least one of electromagnetic and ionizing radiation.

19. A counting digital X-ray image detector, comprising:
a plurality of pixel elements, each of at least one of the plurality of pixel elements and a plurality of pixel clusters composable from the plurality of pixel elements including a counting unit, switchable between at least two different counting modes;
an evaluation unit; and
a switchover unit, and wherein
the counting unit is configured to perform at least one count, in at least one of the at least two different counting modes, of at least one of the number and energy of the events in an at least one time interval,
the evaluation unit is configured to perform an evaluation of the at least one count of the at least one of number and energy of the events,
the switchover unit is configured to perform a switchover to another of the at least two counting modes based on the evaluation of the at least one count of the at least one number and energy of the events, and
the counting unit is configured to perform another count, in at least another of the at least two different counting modes, of the at least one of the number and energy of events in an at least another time interval in the another counting mode.

20. The counting digital X-ray image detector of claim 19, wherein a counting mode "reconstruction mode" is chosen as a first of the at least two different counting modes, wherein a count is taken of at least one of the number and energy of the events, wherein one sum signal is respectively determined at each of different nodal points of neighboring pixel elements in the counting mode "reconstruction mode" and the sum signals are each respectively assigned to the respective pixel element which has the relatively largest individual signal contributing to the respective sum signal, and wherein a counting mode "simple counting mode" is chosen as at least another of the at least two different counting modes, wherein a count is taken of at least one of the number and energy of the events in each respective pixel element or in each respective pixel cluster if the number of events in the one time interval or a prediction of the number of events in the time interval exceeds a first threshold.

21. A medical device for acquiring images of an object irradiated by at least one of electromagnetic and ionizing radiation, comprising:
the counting digital X-ray image detector of claim 20.

22. The medical device of claim 21, wherein the medical device represents a device for slice imaging of an object irradiated by at least one of electromagnetic and ionizing radiation.

23. The counting digital X-ray image detector of claim 19, wherein a counting mode "simple counting mode" is chosen as a first of the at least two different counting modes, wherein a count is taken of at least one of the number and energy of the events in each respective pixel element or in each respective pixel cluster and wherein a counting mode "reconstruction mode" is chosen as at least another of the at least two different counting modes, wherein a count is taken of at least one of the number and energy of the events, wherein one respective sum signal is determined at each different nodal points of neighboring pixel elements in the counting mode "reconstruction mode" and wherein the sum signals are each respectively assigned to the respective pixel element which has the relatively largest individual signal contributing to the respective sum signal if the number of events in the one time interval or a prediction of the number of events in the time interval lies below a second threshold.

24. A medical device for acquiring images of an object irradiated by at least one of electromagnetic and ionizing radiation, comprising:
the counting digital X-ray image detector of claim 23.

25. The medical device of claim 24, wherein the medical device represents a device for slice imaging of an object irradiated by at least one of electromagnetic and ionizing radiation.

26. A medical device for acquiring images of an object irradiated by at least one of electromagnetic and ionizing radiation, comprising:
the counting digital X-ray image detector of claim 19.

27. The medical device of claim 26, wherein the medical device represents a device for slice imaging of an object irradiated by at least one of electromagnetic and ionizing radiation.

28. The counting digital X-ray image detector of claim 19, wherein the at least two different counting modes of the counting unit include at least a counting mode involving at least one of a number and energy of events for individual pixel elements or pixel clusters and a counting mode involving at least one of a number and energy of events for individual pixel elements or pixel clusters and for neighboring pixel elements or pixel clusters.

* * * * *